Nov. 19, 1963
J. F. MAGNESS
3,111,547
MANUFACTURE OF ISOPRENE
Filed May 9, 1960
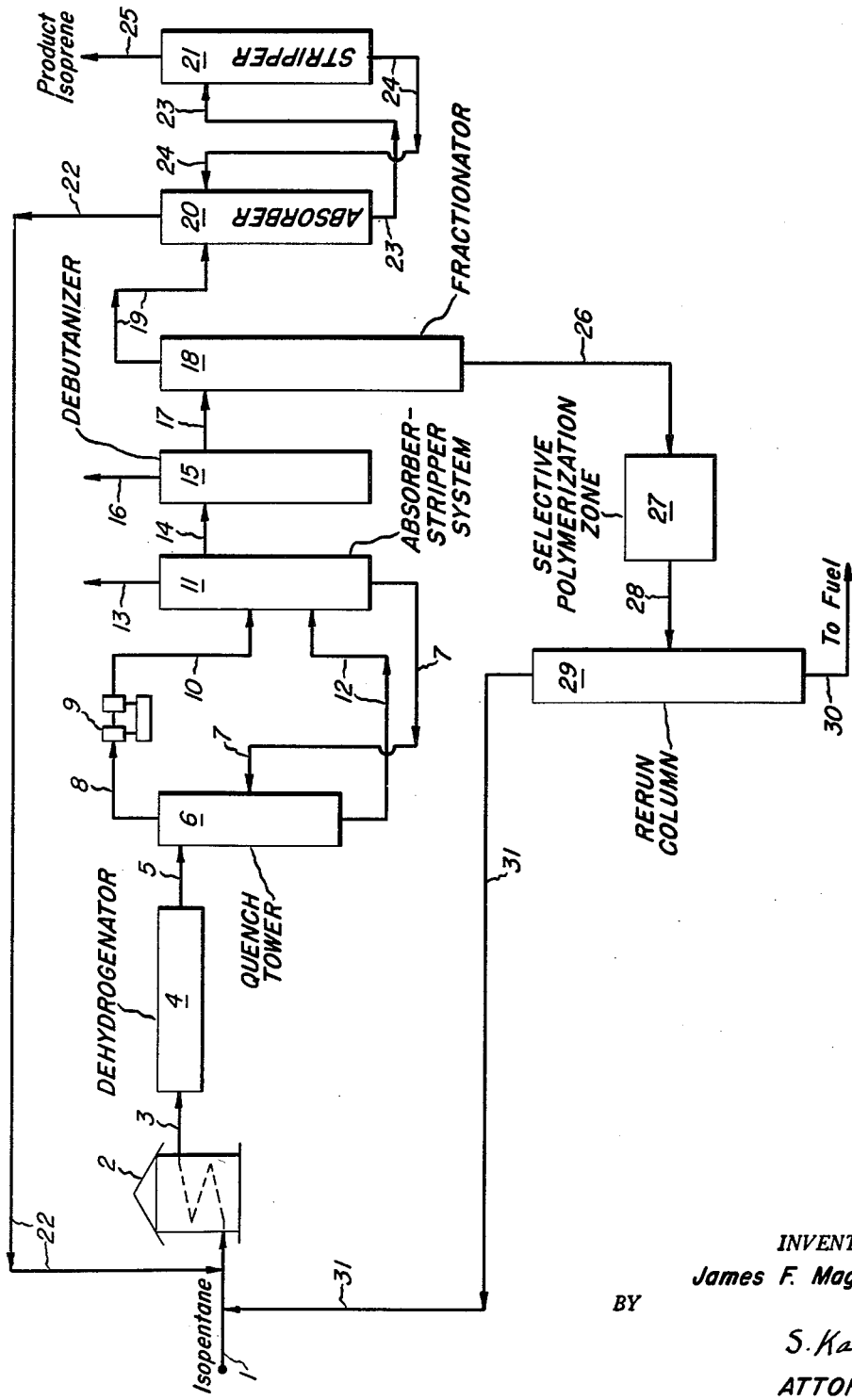
INVENTOR.
James F. Magness
BY
S. Kahn
ATTORNEY

United States Patent Office 3,111,547
Patented Nov. 19, 1963

3,111,547
MANUFACTURE OF ISOPRENE
James F. Magness, Longview, Tex., assignor to Standard
Oil Company, Chicago, Ill., a corporation of Indiana
Filed May 9, 1960, Ser. No. 27,940
5 Claims. (Cl. 260—680)

This invention relates to the manufacture of isoprene and has as a particular object the provision of an improved, integrated process for the conversion of isopentane to isoprene by catalytic dehydrogenation.

Numerous methods are known for isoprene synthesis and a variety of processes for the production of isoprene by the catalytic dehydrogenation of isopentane have heretofore been proposed. All such dehydrogenation processes result in the formation of a dehydrogenate which contains, besides unconverted isopentane feedstock, various amounts of $C_5$ isomeric dehydrogenation products including both monoolefinic and diolefinic constituents. The successful production of isoprene by such processes rests in large part upon the provision of simple, effective and economical means for separating isoprene from close-boiling isomers, and upon maximum utilization of partial dehydrogenation products as recycle streams so as to maximize the conversion of isopentane to isoprene. It has been recognized heretofore that the recycle of pentadienes such as piperylene and cyclopentadiene to the dehydrogenation reactor is undesirable, since these isomers cannot be converted to isoprene and result in increased coke formation in the reactor.

The formation of minor but significant amounts of straight chain $C_5$ diolefins including cis and trans-piperylene and cyclopentadiene during the dehydrogenation of isopentane has made the separation of pure isoprene from the dehydrogenate particularly difficult, because of the close boiling points of these isomers to that of isoprene, and the close chemical similarity of the various pentadienes. Prior art processes for the recovery of isoprene from isopentane dehydrogenation have invariably provided first for the separation of a fraction consisting primarily of diolefins, including isoprene, followed by separation of the isoprene contained in said fraction by extraction or distillation means. Typically, the dehydrogenation product is distilled to remove $C_4$ hydrocarbon and lower boiling materials, and the $C_5$ hydrocarbons extractively distilled using aqueous acetone, to remove a distillate rich in paraffins and monoolefins. The bottoms from such extractive distillation, comprising $C_5$ diolefins including isoprene, other pentadienes and 2-methyl-2-butene is then super fractionated or subjected to a second extractive distillation to yield high purity isoprene as an overhead product, and a bottoms stream comprising pentadienes and 2-methyl-2-butene. Alternative processes for removing isoprene from the $C_5$ dehydrogenate are known, for example by reaction of the dehydrogenate with $SO_2$, to form sulfones from the diolefins present therein, or by treatment with copper salts such as copper ammonium acetate to complex the diolefins with the copper salt, followed by decomposition of the so formed sulfones or copper complexes to regenerate the diolefins. Each of these processes again depends upon the separation of a diolefin fraction which requires further treatment for separation of isoprene from diolefinic materials isomeric therewith.

I have now discovered that isoprene of extremely high purity can be obtained in a simple, economic manner from isopentane dehydrogenation products by first subjecting the $C_5$ fraction thereof to super fractionation to separate an isoprene-rich distillate substantially free of other isomeric diolefins and a bottoms product rich in said isomeric diolefins. The thus obtained isoprene-rich distillate is then subjected to extractive distillation to yield in one step a highly purified isoprene concentrate having commercial utility. My process further contemplates removal of the diolefinic constituents from the super-fractionator bottoms prior to recycle thereof to the dehydrogenation reactor, to avoid coke formation and/or undesirable build up of unwanted isomers such as piperylene in the recycle stream. The process of the present invention is particularly advantageous in that, by first effecting separation of isoprene from other diolefinic isomers, a process recycle stream is provided which can readily be treated for removal of such undesirable diolefins without loss of isoprene.

In the practice of the present invention, an isopentane feed is contacted at a temperature of from about 1000° F. to about 1200° F. with a dehydrogenation catalyst such as an oxide of group VI metal. Commercially available catalysts consisting of about 2%–10% chromia supported on activated alumina are particularly effective. The dehydrogenation is effected at atmospheric or sub-atmospheric pressure, preferably 1–10 p.s.i.a. Space velocity (liquid volume per hour per volume of catalyst) is advantageously within the range of 0.5 to about 5.

The effluent from the dehydrogenation reactor is then treated in conventional stripping and debutanizing apparatus to provide a $C_5$ hydrocarbon stream suitable for further purification to effect separation of pure isoprene. The $C_5$ hydrocarbon stream is super fractionated to yield a distillate containing isoprene and most of the paraffins and monoolefins. The bottoms, comprising primarily straight chain pentadienes, cyclopentadiene and 2-methyl-2-butene are then passed to a polymerization zone for conversion of the diolefinic constituents thereof to dimers and/or low molecular weight polymers having boiling points substantially higher than those of the monoolefins present in the bottoms stream. Simple fractionation of the polymerization zone effluent yields a diolefin-free stream which is recycled to the dehydrogenation reactor.

Isoprene-rich distillate from the super fractionator is processed by extractive distillation utilizing aqueous acetone as solvent for recovery of high purity isoprene as a bottom product, and a distillate which, after washing to remove acetone solvent, is recycled to the dehydrogenation reactor.

In order that those skilled in the art may fully appreciate the nature of my invention and a method for carrying it out, it will be more specifically described in connection with the accompanying drawing, which is a flow sheet of one form of the invention.

In operating in accordance with the process of the present invention, an isopentane feedstock admixed with about 2.3 volumes of recycle hydrocarbon is introduced through line 1 to furnace 2 in which it is preheated to about 1100° F. The feed is then passed via line 3 to catalytic dehydrogenator 4 wherein it is contacted with a catalyst consisting of chromia deposited on activated alumina at a pressure of 3.5 p.s.i.a. and a space velocity of 3.0 liquid volumes per hour per volume of catalyst. Under these conditions, about 30 percent of the total feed is converted to final products. The distribution of the major products is

| Product: | Wt. percent of converted feed |
|---|---|
| Isoprene | 59.0 |
| Light ends | 27.7 |
| Normal $C_5$ hydrocarbon | 3.5 |
| Coke | 9.8 |
| | 100.0 |

The hot product gases pass through line 5 to quench zone 6 which may consist of one or more towers wherein the product gases are cooled by contacting with recycle quench oil introduced via line 7 from absorber-stripper section 11. Preferably, two stages are employed, the effluent product vapor then passing via line 8 to compressor 9 wherein the product vapor is compressed to a pressure of about 45 p.s.i.g. and further cooled. The dehydrogenate then passes through line 10 to a conventional oil absorption and stripping system 11 for recovery of the C$_5$-and-heavier components in the product. Absorber stripper 11 serves to remove dehydrogenate from the quench oil employed in zone 6, rich oil being introduced to 11 via line 12. Uncondensible gases as well as C$_1$–C$_3$ hydrocarbons are removed via line 13 and recovered material is passed through line 14 to debutanizer 15 where any remaining butane and lighter material is removed overhead through line 16 for further processing. The C$_5$ and heavier product is then fed via line 17 to the purification section. Typically, such C$_5$ fraction may have the following composition:

| | Weight percent |
|---|---|
| Butylene | .01 |
| Butane | .01 |
| 3-methyl-1-butene | 2.1 |
| Isopentane | 54.4 |
| 1-pentene | .06 |
| 2-methyl-1-butene | 8.17 |
| Isoprene | 20.2 |
| 2-pentene | .24 |
| n-Pentane | |
| Cyclopentadiene | .04 |
| 2-methyl-2-butene | 12.92 |
| Pentadiene | 1.14 |
| Absorption oil | .95 |
| | 100.24 |

The first step in purification is super fractionation in column 18 which may be any of the usual forms of fractionating devices such as a column containing bubble cap plates. In normal operation of a process according to the invention, between 50 and 60 plates are commonly employed. This column is operated at a pressure of about 20 p.s.i.g. and at a reflux ratio (reflux to distillate product) of about 4/1 to 5/1. Under these conditions, the temperature at the top of the tower is usually about 135° F. and an overhead product is obtained from tower 18 containing over 98% of the isoprene contained in the dehydrogenation effluent, together with unconverted isopentane and a major proportion of the monoolefinic constituents of the dehydrogenate other than 2-methyl-2-butene. Bottoms from tower 18 contain approximately 90% of the cyclopentadiene and over 99% of the pentadienes other than isoprene originally present in the dehydrogenation effluent. The major component of the bottoms is 2-methyl-2-butene. Employing the feedstock of the specific illustration, the distillate and bottoms from such distillation have the following composition (weight percent):

| | Distillate | Bottoms |
|---|---|---|
| Butylene | .01 | |
| Butane | .01 | |
| 3-Methyl-Butene | 2.4 | |
| Isopentane | 61.5 | .01 |
| 1-Pentene | .06 | |
| 2-Methyl-1-Butene | 9.17 | .47 |
| Isoprene | 22.0 | 3.4 |
| 2-Pentene | .2 | .6 |
| Cyclopentadiene | | .33 |
| 2-Methyl-2-Butene | 4.35 | 77.4 |
| Pentadiene | | 9.77 |
| Absorption Oil | | 8.09 |
| | 99.70 | 100.03 |

The distillate stream from tower 18 is passed through line 19 to an extraction section which consists of an absorber tower 20 and stripper tower 21. In tower 20, the distillate is contacted with an acetone-water solution (85–15 weight percent respectively) as the extractant in the ratio of two volumes of extractant per volume of hydrocarbon liquid flowing down the column. Under these conditions, the less polar materials desired for recycle (isopentane and methylbutenes) or their acetone azeotropes are removed as distillate. After a water wash, (not shown) this stream is recycled via line 22 to the reactor. The bottoms product from this extractive distillation is passed through line 23 to stripper column 21, recovering product isoprene as the distillate. Solvent obtained as bottoms from column 21 is recycled via line 24 to absorber 20. The stripper distillate removed through line 25 is water washed (not shown) to remove residual acetone solvent, and the product, containing over 97% isoprene and less than 0.01 part of cyclopentadiene and less than 0.05 part straight chain pentadienes per 100 parts isoprene, meets specifications for polymerization grade isoprene. In the processing of the feedstock of the specific illustration, the composition of the product isoprene stream obtained under the particular operating conditions given shows the following analysis (weight percent):

| | Extractive distillate, isoprene product |
|---|---|
| Isoprene | 97.3 |
| Cyclopentadiene | Less than 0.01 |
| 2-methyl-2-butene | 2.6 |
| Pentadiene | Less than 0.01 |
| Acetone | .1 |
| | 100.0 |

Returning now to tower 18, the bottoms therefrom comprising about 75% of the 2-methyl-2-butene formed in the reactor together with cyclopentadiene and pentadienes is passed via line 26 to selective polymerization zone 27 wherein the bottoms are treated for conversion of cyclopentadiene and pentadienes to higher boiling polymerization products. In polymerization zone 27 the bottoms product is heated to a temperature between about 200° F. and about 300° F. thus effecting conversion of pentadienes and cyclopentadiene to higher boiling products. Polymerization of the diolefins in this stream can be effected by contacting with solid phosphoric acid catalyst (phosphoric acid supported on kieselguhr) or alternatively with metallic sodium at 150° to 300° F. to effect conversion of diolefinic materials to dimers or higher polymers without affecting the monoolefinic compounds contained therein. I prefer to employ metallic sodium, in particulate form for this purpose, at a temperature of about 200° F. employing between about 0.1 and about 1% sodium by weight based on the diolefinic content of the bottoms product. Effluent from polymerization zone 27 is then passed via line 28 to rerun column 29 wherein the diolefin-free recycle material, primarily 2-methyl-2-butene is separated from higher boiling diolefinic conversion products by simple fractionation. Bottoms from column 29 are discarded via line 30, overhead being recycled via line 31 to reaction feed line 1.

The foregoing disclosure and illustration of the invention demonstrate the remarkable simplicity and effectiveness by which isoprene of high purity can be obtained by the process of the invention. Various combinations and variations of the application of the principles described and illustrated herein will be apparent to those skilled in the art and resort may be had to such modifications and variations as fall within the spirit of the invention and the scope of the appended claims.

I claim:

1. An improved process for the production of isoprene which includes the steps of passing a feedstock comprising isopentane to a dehydrogenation zone, contacting it therein with a dehydrogenation catalyst at a temperature of from about 1000° F. to about 1200° F. recovering a reaction product, separating a fraction from said reaction product consisting essentially of five carbon hydrocarbons, subjecting said fraction to fractional distillation to obtain a distillate stream containing isoprene and substantially free of cyclopentadiene and straight chain pentadienes, and a bottoms stream rich in diolefinic hydrocarbons other than isoprene, subjecting said distillate stream to extractive distillation in the presence of acetone to effect substantially complete separation of isoprene from other five carbon hydrocarbons in said distillate stream, treating said bottoms stream under polymerization reaction conditions to polymerize diolefinic hydrocarbons therein, separating polymer so formed from associated $C_5$ hydrocarbons and recycling all of the five carbon hydrocarbons with the exception of isoprene to the dehydrogenation zone in admixture with fresh isopentane.

2. The process of claim 1 wherein aqueous acetone containing about 85% acetone and about 15% water by weight is employed in said extractive distillation in an amount of about two volumes per volume of said distillate stream.

3. The process of claim 1 wherein polymerization of diolefin hydrocarbons in said bottoms stream is effected by thermal treatment at a temperature between about 200° F. and 300° F.

4. The process of claim 1 wherein polymerization of diolefin hydrocarbons in said bottoms stream is effected by contacting said bottoms stream with particulate sodium in an amount between about 0.1 and about 1.0% based on the weight of diolefinic hydrocarbons in said stream at a temperature in the range of 150° F. to 300° F.

5. A process for the production of isoprene which comprises passing a feedstock comprising isopentane to a dehydrogenation zone, contacting said feedstock therein with a dehydrogenation catalyst at a temperature in the range of from about 1000° F. to about 1200° F., recovering a reaction product, separating a fraction from said reaction product consisting essentially of five-carbon hydrocarbons, subjecting said fraction to fractional distillation to obtain a distillate stream comprising isoprene essentially free of other diolefinic hydrocarbons and a bottoms stream rich in diolefinic hydrocarbons other than isoprene and containing about 90% of the cyclopentadiene and over 99% of the pentadienes other than isoprene originally present in said fraction, separating isoprene from said distillate stream by extractive distillation in the presence of acetone, removing diolefinic hydrocarbons from said bottoms stream by treating said stream under polymerization conditions to polymerize said diolefins and thereafter separating therefrom the resulting polymer, and recycling all the five-carbon hydrocarbons with the exception of isoprene and said diolefinic hydrocarbons to the dehydrogenation zone in admixture with fresh isopentane.

References Cited in the file of this patent

UNITED STATES PATENTS

| | | |
|---|---|---|
| 2,398,930 | Gary | Apr. 23, 1946 |
| 2,461,346 | Patterson | Feb. 8, 1949 |
| 2,900,429 | Heinemann et al. | Aug. 18, 1959 |
| 2,914,588 | Dempsey | Nov. 24, 1959 |
| 2,982,795 | Owen | May 2, 1961 |